Dec. 1, 1953     C. J. FORSCHNER     2,660,947
BEVERAGE BREWING MACHINE
Filed May 27, 1948
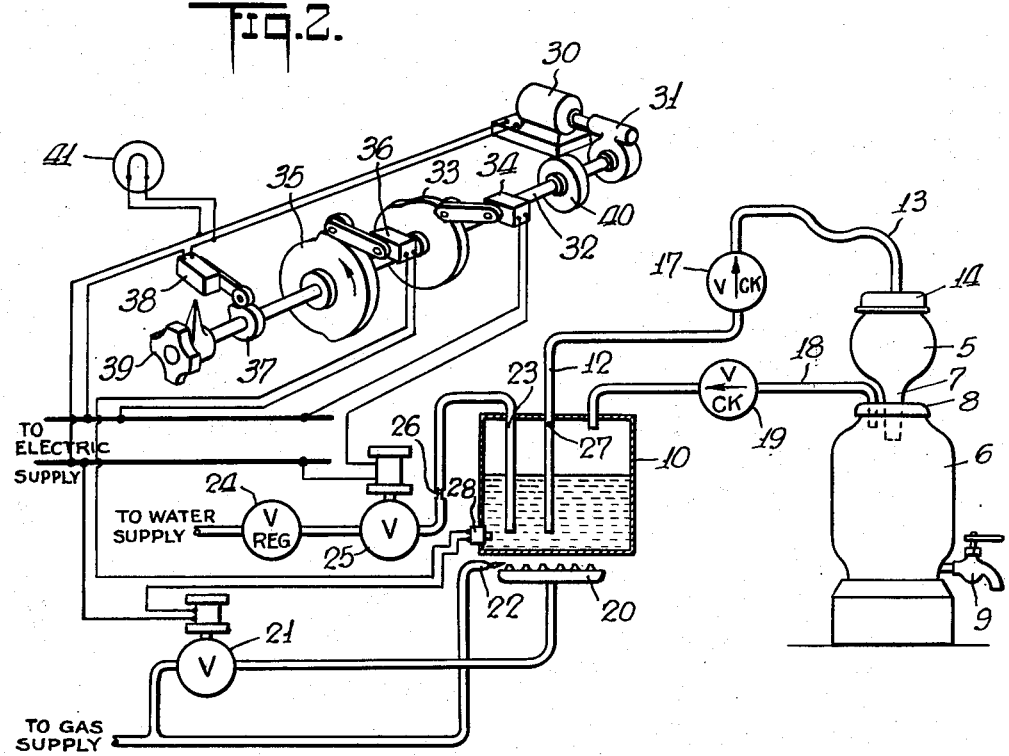
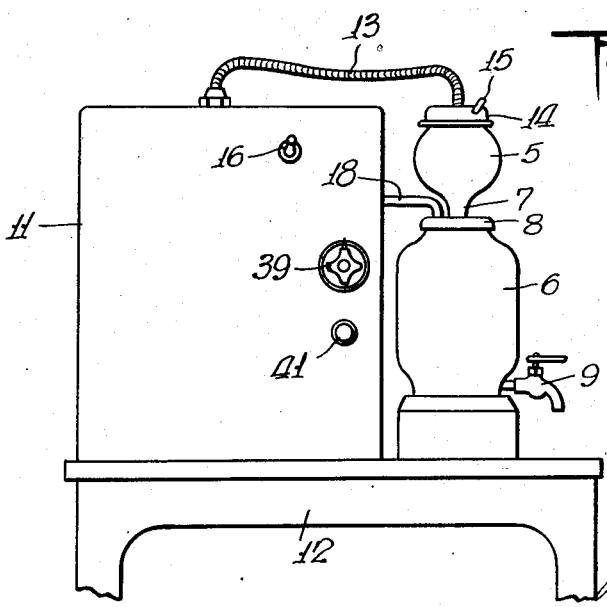
INVENTOR
Conrad J. Forschner
BY
ATTORNEYS Patented Dec. 1, 1953

2,660,947

UNITED STATES PATENT OFFICE 2,660,947

BEVERAGE BREWING MACHINE

Conrad John Forschner, New York, N. Y.

Application May 27, 1948, Serial No. 29,555

5 Claims. (Cl. 99—282)

My invention relates to an automatic beverage-brewing machine.

In restaurants, lunch counters, and the like where coffee, tea, and other beverages must be brewed in quantities and where the person responsible for brewing such beverages can devote only a relatively small fraction of his time and attention to this task, it is virtually impossible for the beverage to be brewed uniformly from batch to batch. Quality and taste of the brewed beverage therefore suffer, to the impairment of the customer's satisfaction. Also, in order to produce a given strength of the beverage, there may be needless waste of the grounds, leaves, or the like from which the brew is made.

It is, accordingly, an object of my invention to provide an improved beverage-making apparatus particularly for the application indicated.

It is another object to provide an improved beverage-making apparatus that will assure a uniformly brewed product, from batch to successive batch.

It is also an object to provide a more completely automatic beverage-making apparatus which will require no more attention of the person responsible for brewing than that he initiate the automatic process.

It is a further object to provide an improved beverage-making device of the induced-vacuum type wherein there may be no water dilution of the beverage after it is brewed.

It is a specific object to provide an improved beverage-making apparatus wherein steam-condensation in a vessel other than in the brewed-beverage receptacle is utilized to induce a vacuum for beverage extraction.

It is a general object to achieve the above objects with an inherently simple apparatus that is not likely to get out of order, that will be easy to clean and service, and that will be economical in the use of the grounds, leaves, or the like from which the brew is to be made.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a side elevation of an automatic beverage-making apparatus incorporating features of the invention; and Fig. 2 is a more or less schematic view illustrating the operative relationship of elements in the beverage-making device of Fig. 1.

Briefly stated, my invention contemplates an improved beverage-making device of the induced-vacuum type wherein the condensation of steam or heated water vapor in a vessel or chamber other than the brewed-beverage receptacle may be utilized to create a partial vacuum, which may be utilized to force an extraction of the brew. For automatic operation my invention may include timing means for controlling the admission of heat to a water heater in timed sequence with a controlled admission of water to the water heater, and the partial vacuum may be created upon a cooling of hot-water vapor or steam generated by the water heater, as when fresh water is admitted to the water heater. Novel simplified means are disclosed for assuring that the water admitted to the water heater with each cycle is maintained at a given regulated quantity.

Referring to the drawings, my invention is shown in application to a beverage-making apparatus including a brewing chamber or receptacle 5 and a brewed-beverage chamber or receptacle 6, one above the other. The brewing receptacle may be formed and positioned so as to discharge directly into the brewed-beverage receptacle 6, as at a necked-down portion 7, and the upper end of the brewed-beverage receptacle 6 is preferably in fluid-sealed relation with the necked portion 7. In the form shown, this seal is effected by a suitable cover 8, which is preferably removable from the upper end of the receptacle 6. The brewed-beverage receptacle 6 may have and preferably does have a spigot 9 communicating with the lower end thereof for the drawing off of brewed beverage as desired.

Hot water may be generated in a water heater or boiler 10 which, along with other elements of the mechanism, may be contained within a suitable cabinet or housing 11 located on a common table or platform 12 with the brewing and brewed-beverage receptacles 5—6. Hot water from the boiler may be supplied to the brewing receptacle 5 through a riser 12 extending into the boiler 10 and including a flexible hose or the like 13 positioned by a cover member 14 on the receptacle 5 for discharge into the receptacle 5. If desired, the cover 14 may include a handle 15 to assist in removing the cover 14, and a hook or other supporting device 16 on the side of the cabinet 11 may serve to support the cover 14 by the handle 15 when removing used coffee grounds, tea leaves, as the case may be, from the brewing receptacle 5. For a purpose which will later be clear, the line which includes the riser 12 and the flexible hose 13 preferably also includes check-valve means 17 or the like for permitting flow in said line essentially only in the direction indicated by the arrow, that is, in the direction from the boiler 10 to the brewing receptacle 5.

In accordance with a feature of the invention, a further fluid-communicating connection 18 is provided between the brewed-beverage receptacle 6 and a chamber for the accumulation of steam or heated vapor. In the form shown, this chamber is one and the same with the boiler 10, and the pipe for this connection may enter the receptacle 6 through appropriate sealing means in the cover 8. For a purpose which will later be clear, the connection 18 preferably includes a restriction or a check-valve means permitting vapor flow substantially only in the direction indicated by the arrow, that is, from the brewed-beverage chamber or receptacle 6 to the steam chamber or boiler 10.

The heating means for the boiler 10 may be conventional and in the form shown such heating means includes a gas burner 20 which may be connected to the regular gas supply. The gas flow to the burner 20 may be controlled by a solenoid-operated valve 21. Piloting means 22 may also be provided and maintained constantly burning at or near the burner 20.

Water supplied to the boiler 10 may enter in a pipe 23, and any desired measuring means may be employed for admitting a predetermined quantity of water with each admission of water to the boiler. In the form shown, I employ relatively simple means for the metering of fresh water and rely upon a timed flow of water at essentially constant pressure. If desired, a regulating valve 24 may be employed to assure the maintenance of constant pressure, and in the form shown solenoid-operated on-off valve means 25 controls the admission or not of water to the boiler. If desired, a restrictive orifice 26 may be included in the inlet pipe 23 for the further assurance of constant pressure while water is being admitted to the boiler.

In operation, the brewing chamber or receptacle 5 should first be loaded with ground coffee, tea leaves, or the like, depending upon the beverage to be brewed therein. The cover 14 may then be placed over the receptacle 5 and heat admitted to the burner 20. The boiler 10 is preferably of a design permitting a high rate of heat transfer and may be generally of the type disclosed in my Patent 2,210,126 and in my copending patent application Serial No. 780,187, filed October 16, 1947. As the water in the boiler 10 is heated, the vapor pressure over the water surface will increase until the developed pressure is able to force the discharge of hot water into the brewing receptacle 5. In order to assure that this discharge will not be premature and that it will occur at the desired pressure (corresponding to the desired hot-water temperature), a small air-discharge aperture 27 may be provided in the riser 12 opening into the vapor volume within the boiler, as disclosed more fully in the said copending application.

Once the charge of water has been delivered to the brewing chamber or receptacle 5, the heat supplied to the burner 20 is preferably cut off, as by operation of the valve 21, and the water level in the boiler 10 will then be substantially that of the lower end of the riser 12. This level should be such as to maintain the desired standards of safety within the boiler 10; and, if desired for further safety, a thermostatic switch 28 may monitor the boiler temperatures so as automatically to shut off the gas-supply valve upon attainment of an upper temperature limit.

Following the discharge of hot water into the brewing receptacle 5, there is preferably a pause during which the brewing process is allowed to proceed within the receptacle 5. This process may take some 60 seconds, more or less, as desired. After this pause, steam or hot-water vapor in the chamber 10 may be allowed to cool and thus to create a partial vacuum; in the form shown, this effect follows admission of a new and metered supply of relatively cool fresh water to the boiler 10, and the cooling effect of this new water in the boiler 10 will be sufficient to produce a partial vacuum in the boiler 10. In the presence of such a condensation-induced vacuum the check valve 19 will open, so that the brewed-beverage chamber or receptacle 6 may be placed under the same partial-vacuum conditions as obtained within the boiler 10. At the same time, it will be understood that the function of check valve 17 may be to prevent the entrance of air at atmospheric pressure through the line 12—13 and into the boiler 10 while such partial vacuum exists. It will further be appreciated that the presence of a partial vacuum in the receptacle 6 may force a relatively quick discharge of the brewed beverage through filtering means in the upper receptacle 5 and down into the lower receptacle 6; such discharge may, of course, be favored if the fit of cover 14 on receptacle 5 is not a sealing fit or if a suitable opening (not shown) is provided in the upper part of chamber 5 or in the cover 14, so that atmospheric pressure may be present above the coffee grounds, tea leaves, or the like.

In accordance with a feature of the invention, the described cycle of operation may be performed completely automatically, as by the use of electrically operated timing means. In the form shown, this timing means is driven by an electric motor 30 operating through reduction-gear means 31 to drive a camshaft 32. A cam 33 on the shaft 32 is designed for appropriate timing of the operation of a switch 34 for controlling the admission of water through the inlet pipe 23 to the boiler 10. A further cam 35 may be designed for appropriate operation of a switch 36 for timing the solenoid valve 21 controlling the admission of heat to the boiler 10. If desired, still another cam 37 may be designed for operating a switch 38 to shut off the motor 30 upon completion of the described cycle of events, and in the form shown the switch 38 is operative to shut off the timing means 30, preferably immediately after the supply of inlet water has been cut off by the valve 25. In order to start the timing cycle there may be a hand knob 39 accessible externally of the cabinet 11; and by employment of an overrunning clutch 40 between the timing means 30 and the camshaft 32, it will be understood that the necessary initial movement of the hand knob 39 may be free so that switch 38 may be readily closed to start the timing cycle. If desired, a warning lamp, such as the lamp 41, may be placed conspicuously outside the cabinet 11 so as to indicate that the timing mechanism, and hence the brewing process, is in operation.

It will be appreciated that I have described a relatively simple brewing device for making beverages such as tea or coffee with complete uniformity from batch to batch. Whether the apparatus is started cold (as when making the first batch of the day) or hot (as during the rush hour when many batches must be prepared to fill the receptacle 6), the product may always be of the same strength and be produced in the same relatively short cycle of operation. In actual practice I have found a three-minute cycle to be completely feasible for the brewing of coffee or of tea, as follows:

| Time (seconds) | Event |
| --- | --- |
| 0 | Manually turn knob 39 until lamp 41 is lighted. |
| 0-90 | Heat is applied to boiler 10; this is more than enough time for hot water to discharge into brewing receptacle 5. |
| 90-150 | Pause to permit brewing in receptacle 5. |
| 150-180 | Opening of water-supply valve 25 to create partial vacuum in receptacle 6 and to fill boiler 10 with a metered fresh charge of water. |

While I have described my invention in detail for the preferred form shown, it will be understood that modifications may be made within the scope of the invention as defined in the appended claims.

I claim:

1. In a beverage-making device of the character indicated, chamber means including means generally internally vertically dividing said chamber means into an upper brewing chamber and into a lower brewed beverage chamber, said dividing means including means for supporting grounds or the like from which a beverage is to be brewed, a boiler spaced from said chamber means and having a hot-water delivery capacity no greater than the capacity of said brewing chamber, heating means for said boiler and including a control element for said heating means, replacement-water supply means including a control valve connected to said vessel, and fluid-conducting means connecting said boiler to the upper part of said brewed-beverage chamber and to said brewing chamber, said fluid-conducting means including pressure-responsive fluid-flow control means having a first unidirectional response to an excess of pressure in said boiler over pressure in said chamber means to direct fluid flow through said fluid-conducting means only into said brewing chamber, said control means having a second unidirectional response to an excess of pressure in said chamber means over pressure in said boiler to make possible flow through said fluid-conducting means only from said brewed-beverage chamber to said boiler, and automatic interlocking means interconnecting said control element and said control valve to assure substantially no supply of heat to said boiler as long as said control valve is in the position for admitting replacement water to said boiler.

2. In a brewing device of the character indicated, a brewing chamber, a brewed-beverage chamber, a water heater separate from said chambers and including a vessel and heating means therefor, said heating means including a control element therefor, actuating means for said control element, a discharge connection from said vessel to said brewing chamber, said discharge connection including a first check valve connected for unidirectional flow from said vessel to said brewing chamber, the discharge capacity of said vessel being no greater than the capacity of said brewing chamber, replacement-water supply means including a control valve connected to said vessel, actuating means for said control valve, a vacuum connection from the upper part of said brewed-beverage chamber to said vessel, said vacuum connection including a second check valve connected for unidirectional flow from said brewed-beverage chamber to said vessel, and interlocking means interconnecting the actuating means for said control element and the actuating means for said control valve to assure substantially no supply of heat to said vessel as long as said control valve is in the position for admitting replacement water to said vessel.

3. A brewing device according to claim 2, in which said actuating means includes in each case a solenoid, and in which said interlocking means is a motor-operated electric switch connected to operate the first of said solenoid-controlled actuating means in a predetermined cyclic sequence and to operate said second solenoid-controlled actuating means in another sequence having the same cyclic period as said first sequence.

4. In a brewing device of the character indicated, a brewing chamber, a brewed-beverage chamber, a water heater separate from said chambers and including a vessel and heating means therefor, said heating means including a control element therefor, a discharge connection including a first check valve connected for unidirectional flow from said vessel to said brewing chamber, the discharge capacity of said vessel being no greater than the capacity of said brewing chamber, replacement-water measuring means including regulating-valve and control-valve means in series with a restrictive orifice and connected to said vessel and to replacement-water supply means, a vacuum connection from the upper part of said brewed-beverage chamber to said vessel, said vacuum connection including a second check valve connected for unidirectional flow from said brewed-beverage chamber to said vessel; interlocking means interconnecting said control element and said control-valve means and connecting said measuring means to said vessel in a first relationship, said interlocking means connecting said control element for supply of heat to said vessel in a second relationship, and said interlocking means actuating said control-valve means and said control element to cut off both the supply of heat and of water to said vessel in a third relationship; and motor-operated timer means connected to operate said interlocking means in a predetermined cyclical sequence including all three of said relationships in succession.

5. In a brewing device of the character indicated, a brewing chamber, a brewed-beverage chamber, a water heater separate from said chambers and including a vessel and heating means therefor, said heating means including a control element therefor, actuating means for said control element, a discharge connection from said vessel to said brewing chamber, said discharge connection including a check valve connected for unidirectional flow from said vessel to said brewing chamber, the discharge capacity of said vessel being no greater than the capacity of said brewing chamber, vacuum-inducing means including a unidirectional-flow connection between said vessel and the upper part of said brewed-beverage chamber for unidirectional flow only from said brewed-beverage chamber to said vessel, said vacuum-inducing means further comprising replacement water supply means for said vessel and including actuating means comprising a control valve connected to said vessel, and interlocking means interconnecting the actuating means for said control element and the actuating means for said vacuum-inducing means to assure substantially no supply of heat to said vessel as long as a vacuum is being induced in said brewed-beverage chamber by said vacuum-inducing means.

CONRAD JOHN FORSCHNER.

References Cited in the file of this patent

UNITED STATES PATENTS

| Number | Name | Date |
|---|---|---|
| Re. 22,879 | Peters et al. | May 13, 1947 |
| 41,974 | Class et al. | Mar. 22, 1864 |
| 871,491 | Dunlap | Nov. 19, 1907 |
| 912,634 | Warburton | Feb. 16, 1909 |
| 1,349,236 | Strohbach | Aug. 10, 1920 |
| 1,376,287 | Meyfarth | Apr. 26, 1921 |
| 1,385,593 | Strohbach | July 26, 1921 |
| 1,423,547 | Strohbach | July 25, 1922 |
| 1,621,620 | Bast | Mar. 22, 1927 |
| 1,687,095 | Jones | Oct. 9, 1928 |
| 1,709,290 | Torriani | Apr. 16, 1929 |
| 1,796,518 | Glascock | Mar. 17, 1931 |
| 1,822,433 | Brand | Sept. 8, 1931 |
| 1,981,171 | Greenwald | Nov. 20, 1934 |
| 2,014,325 | Grilli | Sept. 10, 1935 |
| 2,210,126 | Risien et al. | Aug. 6, 1940 |
| 2,314,018 | Sanderson | Mar. 16, 1943 |
| 2,345,146 | Perlusz et al. | Mar. 28, 1944 |
| 2,544,836 | Hotvedt | Mar. 13, 1951 |

FOREIGN PATENTS

| Number | Country | Date |
|---|---|---|
| 281,270 | Germany | Dec. 31, 1914 |
| 289,689 | Great Britain | May 3, 1928 |